(12) United States Patent
Chu

(10) Patent No.: US 7,812,922 B2
(45) Date of Patent: Oct. 12, 2010

(54) LIQUID CRYSTAL ALIGNING DEVICE AND ALIGNMENT METHOD THEREOF

(75) Inventor: Kuei-Lin Chu, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 141 days.

(21) Appl. No.: 12/164,247

(22) Filed: Jun. 30, 2008

(65) Prior Publication Data
US 2009/0195746 A1 Aug. 6, 2009

(30) Foreign Application Priority Data
Feb. 1, 2008 (CN) .......................... 2008 1 0300302

(51) Int. Cl.
*G02F 1/1339* (2006.01)
*G02F 1/1337* (2006.01)
(52) U.S. Cl. ...................................... 349/191; 349/123
(58) Field of Classification Search .............. 349/114, 349/173, 174, 191, 123, 128, 129, 182
See application file for complete search history.

(56) References Cited
U.S. PATENT DOCUMENTS

| | | | | |
|---|---|---|---|---|
| 5,909,265 A * | 6/1999 | Kim et al. .................... | 349/129 |
| 6,771,334 B2 * | 8/2004 | Kubota et al. ................ | 349/106 |
| 7,724,333 B2 * | 5/2010 | Sohn et al. ................... | 349/129 |
| 2002/0171792 A1 * | 11/2002 | Kubota et al. ............... | 349/114 |
| 2005/0264730 A1 * | 12/2005 | Kataoka et al. ............. | 349/114 |
| 2007/0153190 A1 * | 7/2007 | Chen et al. .................. | 349/134 |
| 2008/0106683 A1 * | 5/2008 | Hanaoka et al. ............ | 349/123 |
| 2009/0056853 A1 * | 3/2009 | Pai et al. ...................... | 156/60 |
| 2009/0111349 A1 * | 4/2009 | Hsieh et al. .................. | 445/25 |
| 2009/0174851 A1 * | 7/2009 | Chen et al. .................. | 349/128 |

\* cited by examiner

*Primary Examiner*—Akm E Ullah
(74) *Attorney, Agent, or Firm*—Steven M. Reiss

(57) ABSTRACT

A liquid crystal aligning device (10) includes a UV light source (11), a plurality of liquid crystal cells (13), a mask (12), and a drive circuit (14) is described. The mask (12) is positioned between the liquid crystal cells, containing a mixture of a UV polyimide solution and liquid crystal molecules (131), and the UV light source. The drive circuit applies a voltage to the liquid crystal cells. The liquid crystal cells include a reflective area (13a) and a transmissive area (13b), and after exposing the liquid crystal cells to the UV light source and the voltage from the drive circuit, a pretilt angle of the liquid crystal molecules in the reflective area is larger than that in the transmissive area. Further, an alignment method for liquid crystal cells is also described.

16 Claims, 6 Drawing Sheets

LIQUID CRYSTAL ALIGNING DEVICE AND ALIGNMENT METHOD THEREOF

BACKGROUND

1. Field of the Invention

The present invention relates to liquid crystal aligning devices and alignment methods and, particularly to a liquid crystal aligning device used for alignment of transflective liquid crystal displays and an alignment method thereof.

2. Discussion of the Related Art

Liquid crystal display (LCD) devices have come into widespread use in recent years because of their advantages such as the ability to allow production of thinner devices and offer lower power consumption than display devices that utilize cathode ray tubes. Generally, LCD devices are divided into two types: a transmissive type and a reflective type. The transmissive LCD device utilizes light from a so-called backlight to provide a display. However, when the transmissive LCD device is used outdoors sunlight may make it difficult to see images on the display. The reflective LCD device, however, reflects outside light and utilizes the light to provide a display. In this way, the reflective LCD device is capable of providing a satisfactory display outdoors, but not in darker environments. Hence, a so-called transflective LCD device having the functions of both the transmissive and reflective LCD devices is receiving attention.

Generally, for improving quality of LCDs, alignment of liquid crystal molecules requires adjustment before use so the liquid crystal molecules achieve predetermined optical characteristics, for example, predetermined phase retardation. There are several methods of adjusting the alignment of liquid crystal molecules for single cell gap transflective LCD devices. For example, a method in which an organic film is formed on the surface of a substrate and rubbed in one direction with cloth to align the liquid crystals is typically used. However, when liquid crystals are aligned by rubbing, dust is produced or static electricity generated and both may cause a display failure. A photo-alignment method is therefore desirable in which a plurality of regions having different alignment directions can be formed.

A typical photo-alignment method requires performing two different photo-alignments on two indium tin oxide (ITO) substrates. Ultraviolet (UV) curing polyimide material is then coated on the ITO substrates by spin coating. After photo-alignment, two ITO substrates with different photo alignments are then bonded together and the liquid crystal molecules are filled therebetween so as to form a liquid crystal cell. In addition, for a transmissive area and a reflective area of the liquid crystal device, in order to achieve different predetermined phase retardation, two different curing voltages and multiple exposures should be applied to the liquid crystal device, which is difficult and time consuming.

Therefore, a new liquid crystal device and an alignment method thereof are desired.

BRIEF DESCRIPTION OF THE DRAWINGS

Many aspects of the liquid crystal aligning device and the alignment method thereof can be better understood with reference to the following drawings. The components in the drawings are not necessarily to scale, the emphasis instead being placed upon clearly illustrating the principles of the liquid crystal aligning device and the alignment method. Moreover, in the drawings, like reference numerals designate corresponding parts throughout the several views.

DETAILED DESCRIPTION OF THE EMBODIMENTS

Figure 1:
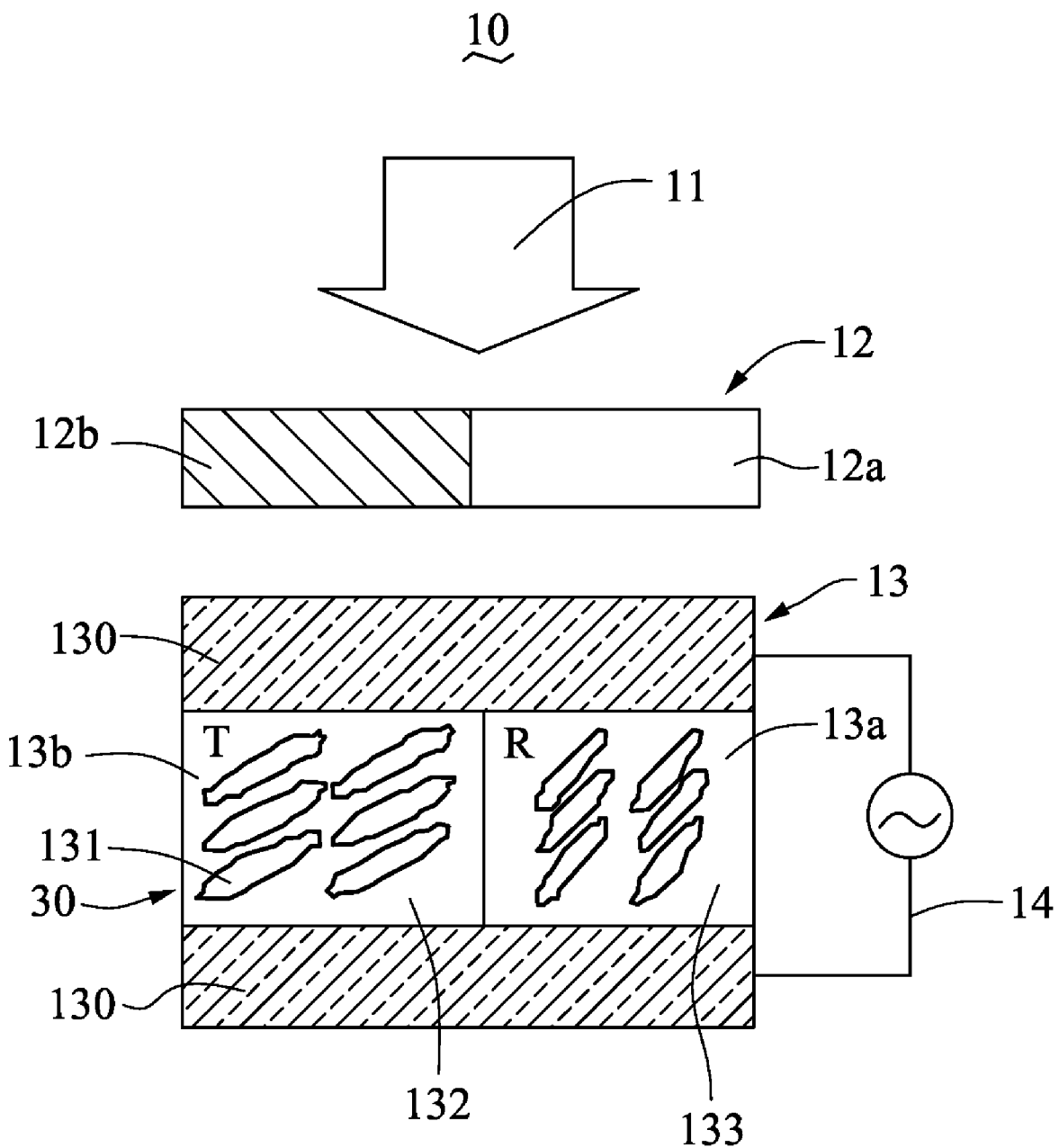
FIG. 1 is a schematic view of an exemplary embodiment of the present liquid crystal cell, as used in a liquid crystal aligning device.

FIG. 1 schematically shows a liquid crystal aligning device 10 including a UV light source 11, a mask 12, a plurality of liquid crystal cells 13 configured (structured and arranged) for forming an LCD, and a drive circuit 14.

Each liquid crystal cell 13 includes a pair of substrates 130 and a liquid crystal layer 30 between the substrates 130. The liquid crystal layer 30 includes a mixture of a UV polyimide solution (not shown) and liquid crystal molecules 13 1 having positive dielectric anisotropy. Each liquid crystal cell 13, i.e., a picture element (a minimum display unit) includes a reflective area 13a (shown as "R") and a transmissive area 13b (shown as "T"). Three liquid crystal cells 13, representing red (R), green (G), and blue (B), respectively form a single "pixel".

For illustration purposes only, FIG. 1 shows the volume of the reflective area 13a equal the volume of the transmissive area 13b. However, the reflectivity of the liquid crystal aligning device 10 may be improved by increasing the volume of the reflective area 13a above the volume of the transmissive area 13b. Thus, the volume ratio of the reflective area 13a to the transmissive area 13b ranges from approximately 1 to 6.

Figure 2:
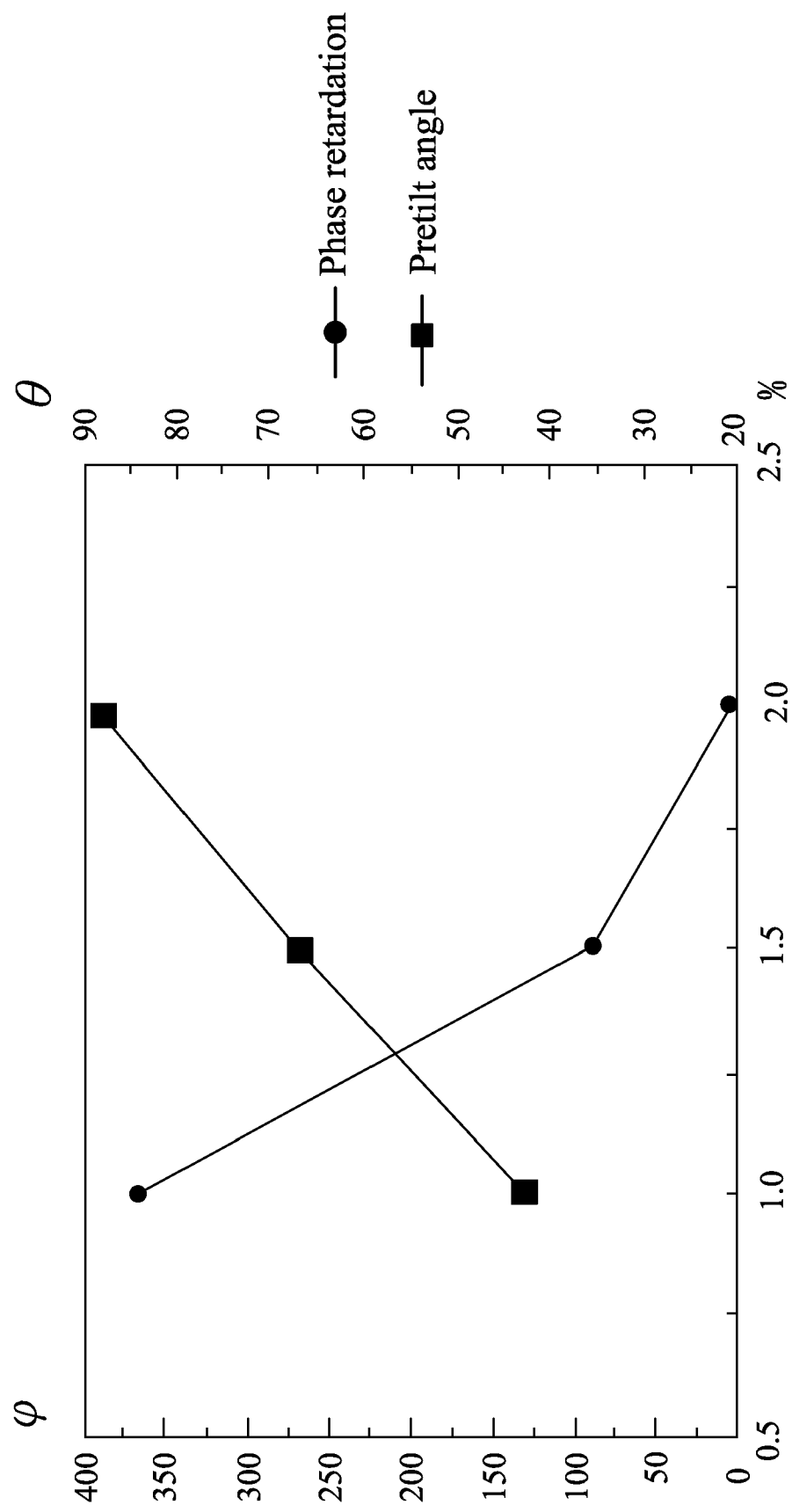
FIG. 2 shows a relationship between phase retardation, concentration of the mixture, and pretilt angle.

The liquid crystal cell 13 is the mixture of a UV polyimide solution and the liquid crystal molecules 131, hereinafter referred to as "the mixture." The UV polyimide solution and the liquid crystal molecules 131 are mixed in a given concentration (wt %). In the exemplary embodiment, the given concentration is approximately 1.5% by volume UV polyimide to liquid crystal. FIG. 2 shows a relationship between a degree of phase retardation ($\psi$), concentration of UV polyimide in the mixture (wt %), and a pretilt angle ($\theta$). As the concentration of UV polyimide in the mixture increases, the degree of phase retardation decreases and the pretilt angle increases. As the concentration of the UV polyimide in the mixture reaches 2%, the pretilt angle is approximately 90 degrees.

Figure 3:
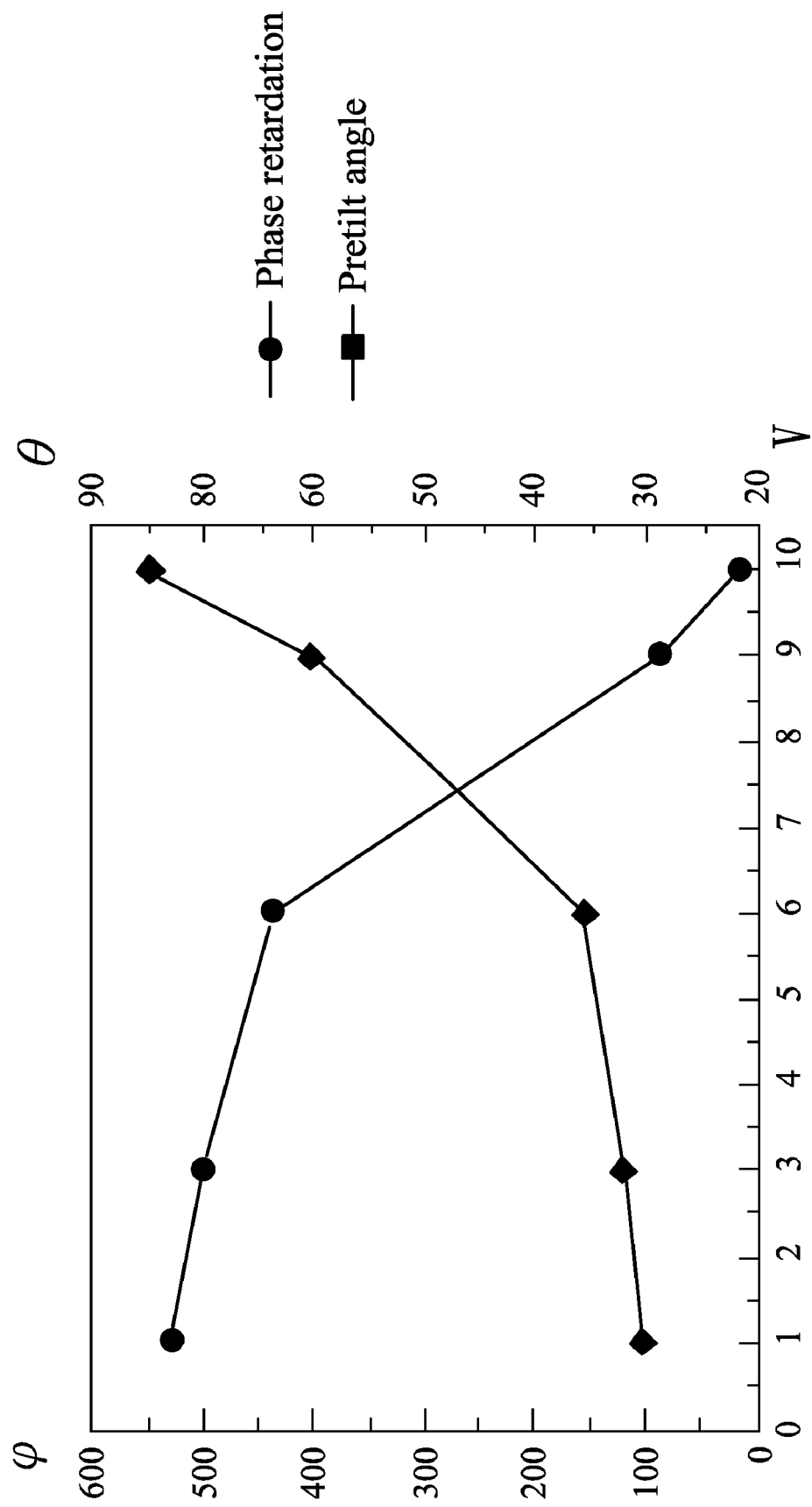
FIG. 3 shows a relationship between phase retardation, concentration of the mixture, and voltage.

The drive circuit 14 is electrically connected to the substrates of the liquid crystal cell 13 for applying a curing voltage to the liquid crystal molecules 131. The intensity of the curing voltage (referred to as "curing voltage") and the application time of the curing voltage (referred to as "curing time") affect the degree of phase retardation and the pretilt angle. Longer curing times are needed as the curing voltage lessens. FIG. 3 illustrates the relationship between the degree of phase retardation ($\psi$), the UV curing voltage (V), and the pretilt angle ($\theta$) when the curing time is approximately 45 minutes and the UV polyimide concentration is approximately 1.5%. By applying curing voltage within a range from about 6V to 10V, the pretilt angle may be controlled in a range from about 35 degrees to 85 degrees. However, during the alignment process, only one curing voltage is applied to the reflective area 13a and the transmissive area 13b, and thus only one drive circuit 14 is needed.

The UV light source 11 radiates UV rays having a uniform wavelength selected from about 254 nm, about 302 nm, and about 365 nm. In alternative exemplary embodiments, UV rays having a wavelength of about 400 nm or less are preferable for aligning the liquid crystal molecules 131. The UV rays are radiated through the mask 12 positioned between the liquid crystal cell 13 and the UV light source 11. The mask 12 has a light-transmitting portion 12a for allowing the UV rays therethrough, and a light-shielding portion 12b for blocking them.

Figure 4:
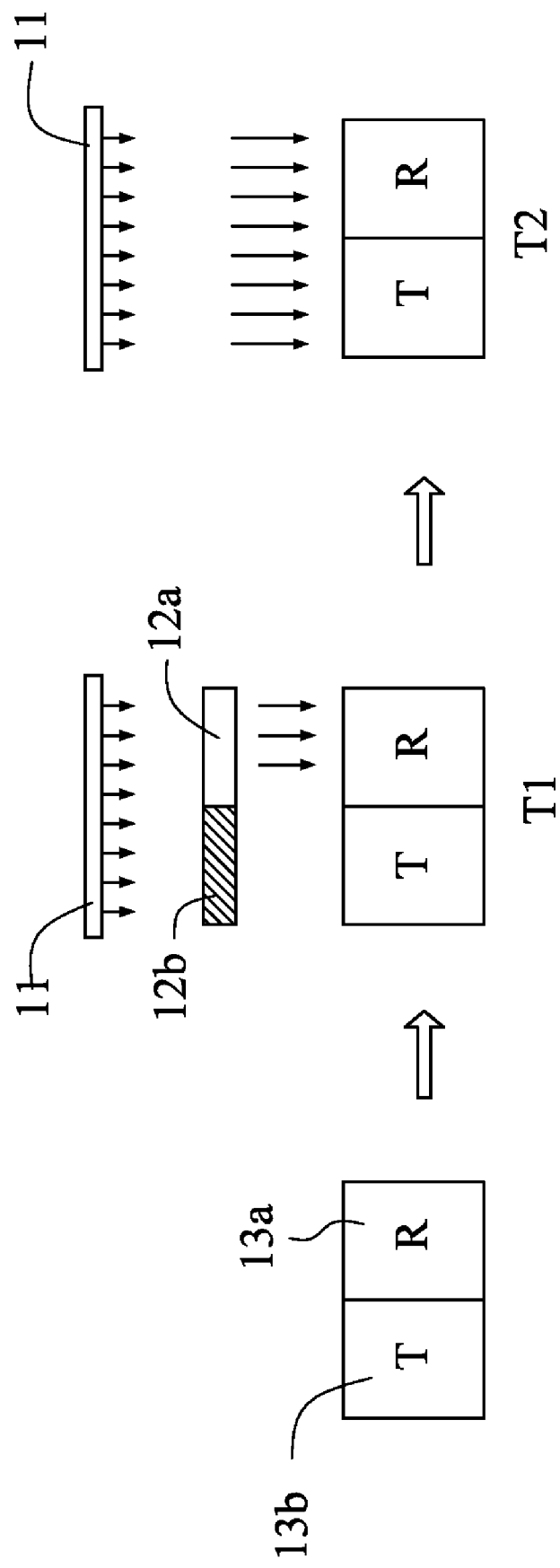
FIG. 4 is a schematic view illustrating a method for controlling the exposure time of the liquid crystal aligning device.

Referring to FIG. 4, before exposure to the UV light source 11, the liquid crystal cell 13 filled with the mixture is placed in a dark chamber. The light-transmitting portion 12a of the mask 12 is then aligned with the reflective area 13a. Therefore, the reflective area 13a will be exposed to the UV rays for a first time period (T1) while the transmissive area 13b is protected from the UV rays for T1. Under alignment regulation forces resulting from the exposure to the UV rays, the liquid crystal molecules 131 are aligned to a pretilt angle relative to the surface of the substrates 130. After T1 has passed, the mask 12 is removed and both the reflective area 13a and the transmissive area 13b are simultaneously exposed to the UV rays for a second time period (T2). In the exemplary embodiment, T1 is approximately 5 to 15 minutes, and T2 is approximately 25 to 35 minutes. Different times T1 and T2 may be selected according to the wavelength of the UV light source 11 and the curing voltage of the substrates 130.

Referring to FIG. 1, the liquid crystal molecules 131 are being controlled to be tilted at the pretilt angle of about 35 degrees to 85 degrees with respect to the surface of the substrates 130 and the pretilt angle of the liquid crystal molecules 131 in reflective area 13a is larger than in the transmissive area 13b.

Figure 5:
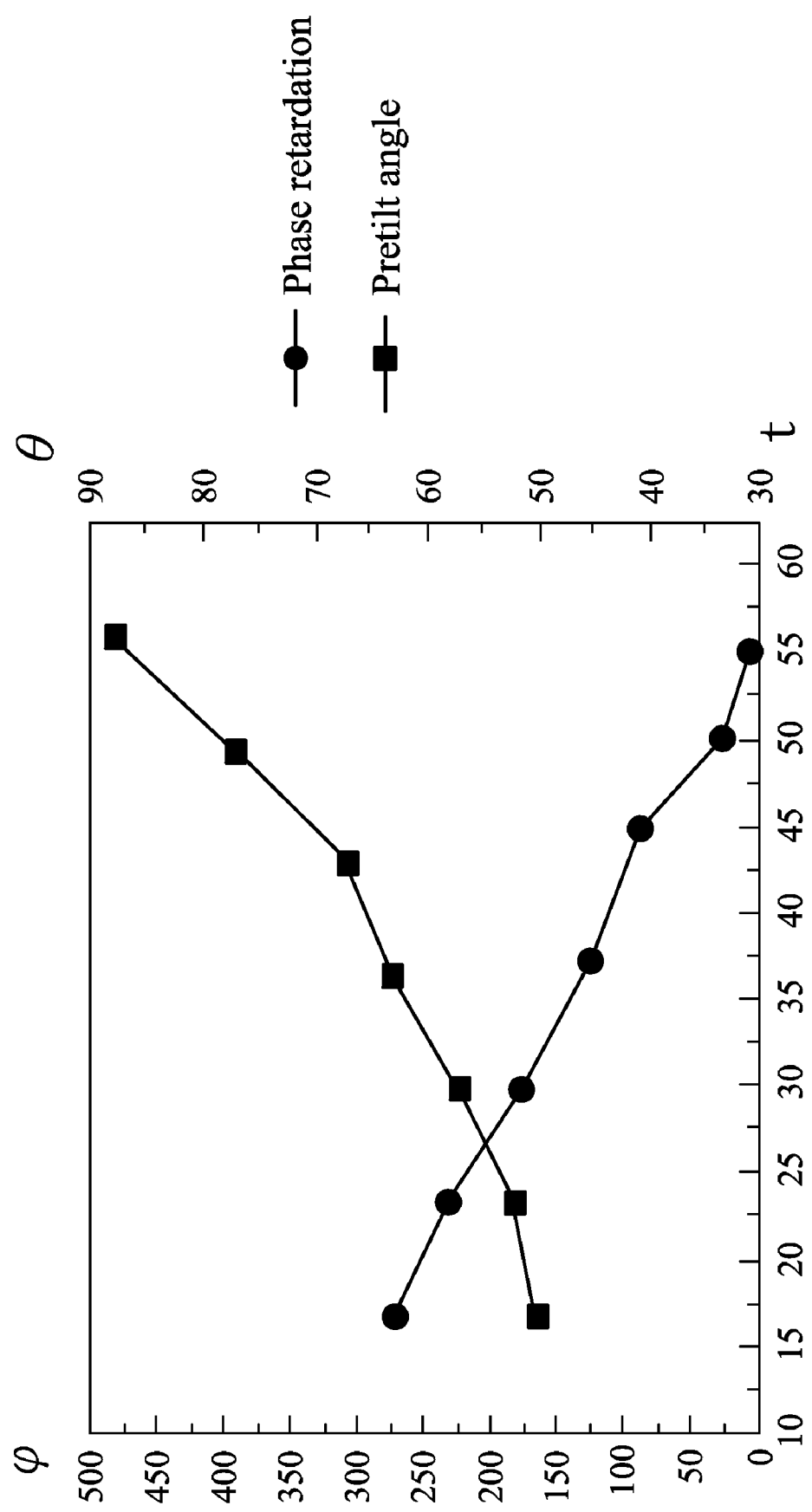
FIG. 5 shows a relationship between phase retardation, exposure period, and pretilt angle.

FIG. 5 illustrates the relationship between the degree of phase retardation ($\psi$), the exposure period (t), and the pretilt angle ($\theta$). The degree of phase retardation decreases as the exposure period increases. In addition, the pretilt angle increases as the exposure period increases. Therefore, because the exposure period of the reflective area 13a is longer than that of the transmissive area 13b, the pretilt angle of the liquid crystal molecules 131 in the transmissive area 13b is smaller than the pretilt angle of the liquid crystal molecules 131 in the reflective area 13a.

Figure 6:
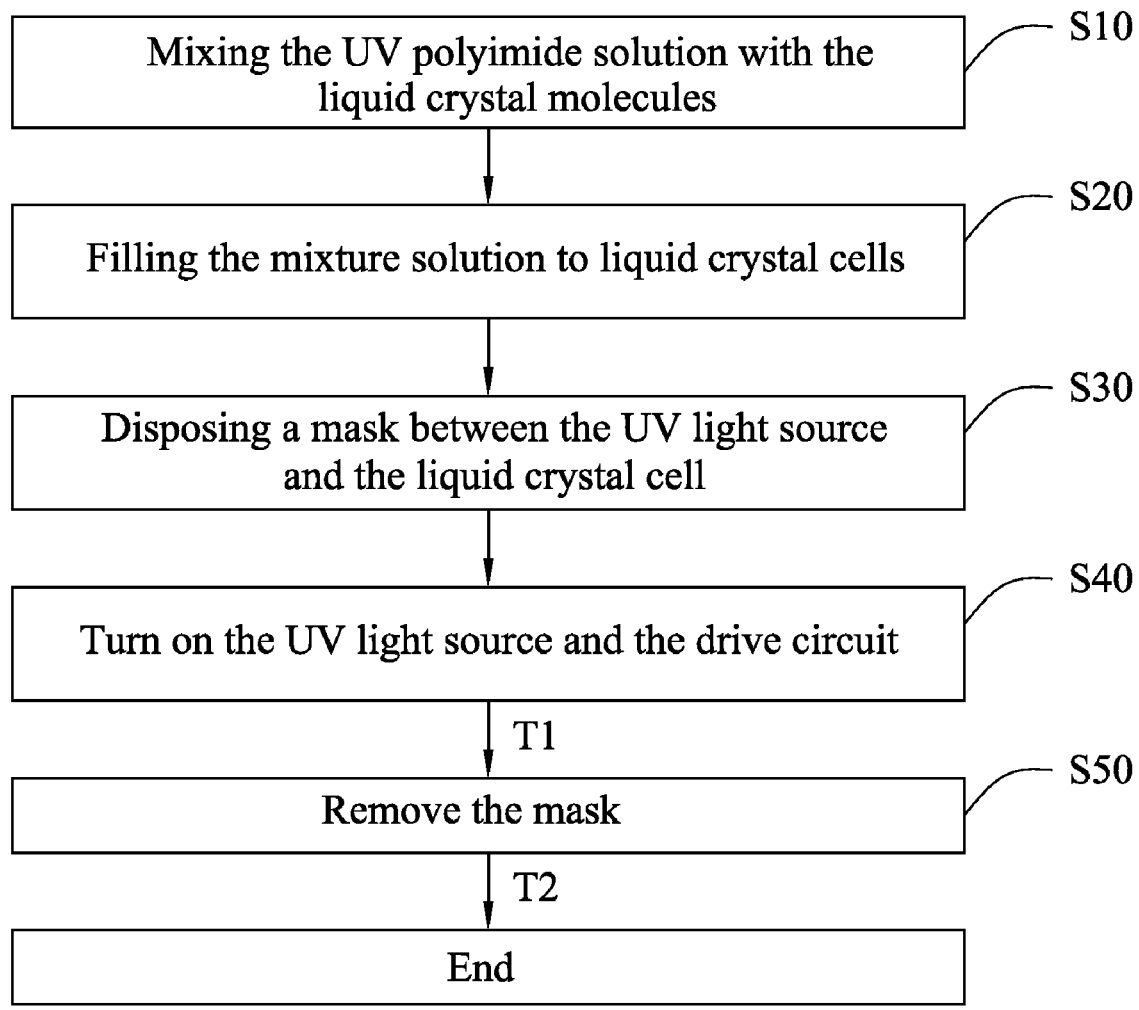
FIG. 6 shows the process of an alignment method according to an exemplary embodiment.

FIG. 6 is a flow chart illustrating the alignment method according to an exemplary embodiment. In step S10, the UV polyimide solution and the liquid crystal molecules 131 are mixed. In step S20, the mixture is filled into the liquid crystal cell 13. In step S30, the mask 12 is positioned between the UV light source 11 and the liquid crystal cell 13. To control the exposure times of the reflective area 13a and the transmissive area 13b, the light-transmitting portion 12a of the mask is aligned with the reflective area 13a. In step S40, the UV light source 11 and the drive circuit 14 are turned on for T1. In step S50, the mask 12 is removed. After T2 passes, the UV light source 11 and the drive circuit 14 are turned off and the alignment process is finished and the liquid crystal cells 13 having aligned liquid crystal molecules 131 are adapted to form an LCD device.

As described above, the liquid crystal aligning device 10 has multi-pretilt angles in multi-domains, i.e., the reflective area 13a and the transmissive area 13b. In addition, the liquid crystal aligning device 10 requires only one drive circuit 14 so that the cost of the liquid crystal aligning device 10 is reduced.

Moreover, during the alignment process, only one exposure is needed so that the process is simple and fast.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal aligning device, comprising:
   a UV light source;
   a plurality of liquid crystal cells having reflective and transmissive areas;
   a mask between the liquid crystal cells and the UV light source; and
   a drive circuit for applying a voltage to the liquid crystal cells; and
   wherein a mixture of a UV polyimide solution and liquid crystal molecules is filled into the liquid crystal cells, and the mixture is exposed to the UV light source and the voltage to adjust pre-tilt angles of the liquid crystal molecules, such that the liquid crystal molecules are tilted at pre-tilt angles in a range of 35-85 degrees, and the pre-tilt angle of the liquid crystal molecules in the reflective area is larger than the pre-tilt angle in the transmissive area.

2. The liquid crystal aligning device as claimed in claim 1, wherein each liquid crystal cell includes a pair of substrates and a liquid crystal layer therebetween.

3. The liquid crystal aligning device as claimed in claim 2, wherein the driving circuit is electrically connected to the substrates of the liquid crystal cell.

4. The liquid crystal aligning device as claimed in claim 1, wherein the volume ratio of the reflective area to the transmissive area ranges from approximately 1 to 6.

5. The liquid crystal aligning device as claimed in claim 1, wherein UV rays radiated from the UV light source having a wavelength less than about 400 nm.

6. The liquid crystal aligning device as claimed in claim 1, wherein the mask has a light-transmitting portion and a light-shielding portion.

7. A alignment method of liquid crystal, comprising the following steps:
   preparing a mixture of UV polymide solution and liquid crystal molecules;
   filling liquid crystal cells with the mixture;
   masking a portion of the liquid crystal cells from a UV light source;
   applying the UV light source to the liquid crystal cells for aligning a first portion of the liquid crystal molecules at a pre-tilt angle and a second portion of the liquid crystal molecules at a second pre-tilt angle, wherein the first pre-tilt angle and the second pre-tilt angle are both in a range of 35-85 degrees, and the first pre-tilt angle is larger than the second pre-tilt angle.

8. The alignment method as claimed in claim 7, wherein the mixing and the filling steps are executed in a dark chamber.

9. The alignment method as claimed in claim 7, wherein UV rays radiated from the UV light source have a uniform wavelength less than about 400 nm.

10. The alignment method as claimed in claim 9, wherein the UV rays radiated from the UV light source have a wavelength selected from 254 nm, 302 nm, and 365 nm.

11. The alignment method as claimed in claim 7, wherein the masking step includes aligning a light-transmitting portion of the mask to a reflective area of the liquid crystal cell and aligning a light-shielding portion of the mask to a transmissive area of the liquid crystal cell.

12. The alignment method as claimed in claim 7, wherein after the UV light source is turned on for a first time period, the mask is removed.

13. The alignment method as claimed in claim 12, wherein the first time period is in a range of approximately 5 to 15 minutes.

14. The alignment method as claimed in claim 12, wherein after exposing the liquid crystal cells to the UV light source for a further second time period, the UV light source is turned off.

15. The alignment method as claimed in claim 14, wherein the first time period is less than the second time period.

16. The alignment method as claimed in claim 14, wherein the second time period is in a range of approximately 25 to 35 minutes.

* * * * *